United States Patent
Kim et al.

(10) Patent No.: US 9,310,991 B2
(45) Date of Patent: Apr. 12, 2016

(54) METHOD AND APPARATUS FOR NAVIGATING CONTENT ON SCREEN USING POINTING DEVICE

(75) Inventors: Yung Kwan Kim, Seoul (KR); Yong Jin Kwon, Suwon-si (KR); Ki Won Lee, Incheon (KR); Ho Shin Lee, Yongin-si (KR); Hyo Jin Lee, Suwon-si (KR); Jung Sic Sung, Yongin-si (KR)

(73) Assignee: Samsung Electronics Co., Ltd., Suwon-si (KR)

( * ) Notice: Subject to any disclaimer, the term of this patent is extended or adjusted under 35 U.S.C. 154(b) by 252 days.

(21) Appl. No.: 13/463,207

(22) Filed: May 3, 2012

(65) Prior Publication Data

US 2013/0044140 A1 Feb. 21, 2013

(30) Foreign Application Priority Data

Aug. 19, 2011 (KR) .................. 10-2011-0082744

(51) Int. Cl.
*G09G 5/00* (2006.01)
*G06F 3/0488* (2013.01)
*G06F 3/0485* (2013.01)

(52) U.S. Cl.
CPC ............ *G06F 3/0488* (2013.01); *G06F 3/0485* (2013.01)

(58) Field of Classification Search
None
See application file for complete search history.

(56) References Cited

U.S. PATENT DOCUMENTS

| 5,347,477 A | 9/1994 | Lee | |
|---|---|---|---|
| 2009/0024314 A1* | 1/2009 | Kim | 701/200 |
| 2009/0292989 A1* | 11/2009 | Matthews et al. | 715/702 |
| 2011/0154196 A1* | 6/2011 | Icho et al. | 715/702 |

FOREIGN PATENT DOCUMENTS

| JP | 4722349 B2 | 4/2011 |
|---|---|---|
| KR | 10-2010-0011336 A | 2/2010 |

* cited by examiner

*Primary Examiner* — Xiao Wu
*Assistant Examiner* — Mohammad H Akhavannik
(74) *Attorney, Agent, or Firm* — Jefferson IP Law, LLP.

(57) ABSTRACT

A method and an apparatus for navigating content larger than a display screen of a terminal using a pointing device are provided. The method includes acquiring, when a pointing position is changed on a screen partially displaying a content that is larger than the screen, a current pointing position by tracking the change of the pointing position, comparing an X axis displacement and a Y axis displacement from an initial pointing position as a starting position to the current pointing position with a predefined X axis threshold value and Y axis threshold value, respectively, determining a movement direction as one of an X axis, a Y axis, and an XY (diagonal) axis directions based on the comparison result, and scrolling the content in the movement direction to display an off-screen part of the content.

12 Claims, 9 Drawing Sheets

METHOD AND APPARATUS FOR NAVIGATING CONTENT ON SCREEN USING POINTING DEVICE

PRIORITY

This application claims the benefit under 35 U.S.C. §119(a) of a Korean patent application filed on Aug. 19, 2011 in the Korean Intellectual Property Office and assigned Serial No. 10-2011-0082744, the entire disclosure of which is hereby incorporated by reference.

BACKGROUND OF THE INVENTION

1. Field of the Invention

The present invention relates to a content navigation method and apparatus. More particularly, the present invention relates to a method and an apparatus for navigating content larger than a display screen of a terminal using a pointing device.

2. Description of the Related Art

A content navigation apparatus is provided with a display unit for displaying a part of a content object larger than a screen of a terminal and a pointing device for navigating the content presented on the screen. Typically, such a pointing device is used on a touchscreen. The content navigation apparatus scrolls the content (e.g., an image) in response to a user action made on the touchscreen to present an off-screen part of the content. Such a content manipulation apparatus can be used for a portable terminal. With the advancement of communication technologies, portable terminals have evolved to provide various functions. For example, recent portable devices, such as a smartphone and a tablet Personal Computer (PC), allow the user to download diverse applications from application markets, i.e., an appstore, and install the downloaded applications.

Meanwhile, the user can make a gesture on the touchscreen to scroll the content in a certain direction. However, the content navigation method of the related art has a drawback in that the content may be scrolled in an unwanted direction due to a user's mis-manipulation or direction measurement error.

Therefore, a need exists for a method and an apparatus for navigating content presented on a screen using a pointing device that is capable of improving interaction reliability by recognizing a user's mis-manipulation and navigation direction measurement error.

SUMMARY OF THE INVENTION

Aspects of the present invention are to address at least the above-mentioned problems and/or disadvantages and to provide at least the advantages described below. Accordingly, an aspect of the present invention is to provide a method and an apparatus for navigating content presented on a screen using a pointing device that is capable of improving interaction reliability by recognizing a user's mis-manipulation and navigation direction measurement error.

In accordance with an aspect of the present invention, a content navigation method using a pointing device is provided. The method includes acquiring, when a pointing position is changed on a screen partially displaying a content that is larger than the screen, a current pointing position by tracking the change of the pointing position, comparing an X axis displacement and a Y axis displacement from an initial pointing position as a starting position to the current pointing position with a predefined X axis threshold value and Y axis threshold value, respectively, determining a movement direction as one of an X axis, a Y axis, and an XY (diagonal) axis directions based on the comparison result, and scrolling the content in the movement direction to display an off-screen part of the content.

In accordance with another aspect of the present invention, a content navigation apparatus using a pointing device is provided. The apparatus includes a display unit for partially displaying a content that is larger than a screen, a position detector for acquiring, when a pointing position is changed on the screen, a current pointing position by tracking the change of the pointing position, a comparer for comparing an X axis displacement and a Y axis displacement from an initial pointing position as a starting position to the current pointing position with a predefined X axis threshold value and Y axis threshold value, respectively, a direction determiner for determining a movement direction as one of an X axis, a Y axis, and an XY (diagonal) axis directions based on the comparison result, and a display controller for scrolling the content in the movement direction to display an off-screen part of the content.

Other aspects, advantages, and salient features of the invention will become apparent to those skilled in the art from the following detailed description, which, taken in conjunction with the annexed drawings, discloses exemplary embodiments of the invention.

BRIEF DESCRIPTION OF THE DRAWINGS

The above and other aspects, features, and advantages of certain exemplary embodiments of the present invention will be more apparent from the following description taken in conjunction with the accompanying drawings, in which.

Throughout the drawings, it should be noted that like reference numbers are used to depict the same or similar elements, features, and structures.

DETAILED DESCRIPTION OF EXEMPLARY EMBODIMENTS

Figure 1:
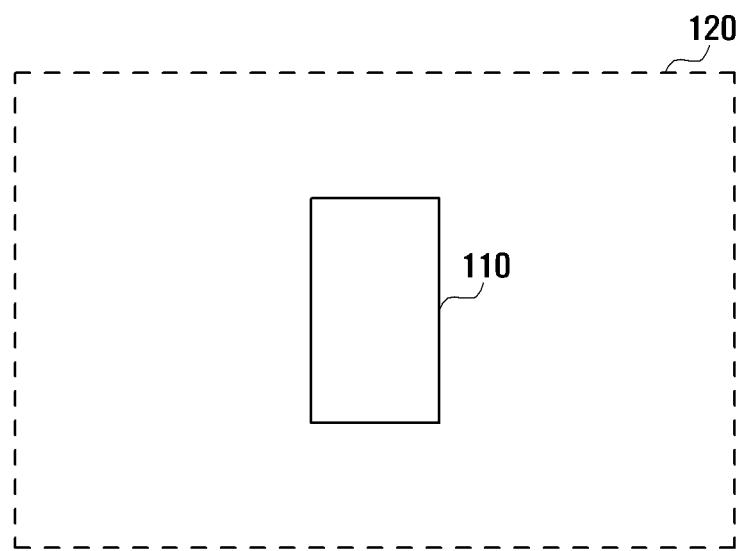
FIG. 1 is a diagram illustrating a screen of a content navigation apparatus according to an exemplary embodiment of the present invention.

The following description with reference to the accompanying drawings is provided to assist in a comprehensive understanding of exemplary embodiments of the invention as defined by the claims and their equivalents. It includes various specific details to assist in that understanding but these are to be regarded as merely exemplary. Accordingly, those of ordinary skill in the art will recognize that various changes and modifications of the embodiments described herein can be made without departing from the scope and spirit of the invention. In addition, descriptions of well-known functions and constructions may be omitted for clarity and conciseness.

The terms and words used in the following description and claims are not limited to the bibliographical meanings, but, are merely used by the inventor to enable a clear and consistent understanding of the invention. Accordingly, it should be apparent to those skilled in the art that the following description of exemplary embodiments of the present invention is provided for illustration purpose only and not for the purpose of limiting the invention as defined by the appended claims and their equivalents.

It is to be understood that the singular forms "a," "an," and "the" include plural referents unless the context clearly dictates otherwise. Thus, for example, reference to "a component surface" includes reference to one or more of such surfaces.

By the term "substantially" it is meant that the recited characteristic, parameter, or value need not be achieved exactly, but that deviations or variations, including for example, tolerances, measurement error, measurement accuracy limitations and other factors known to those of skill in the art, may occur in amounts that do not preclude the effect the characteristic was intended to provide.

Exemplary embodiments of the present invention provide a navigation apparatus with a pointing device that can be applied to all the types of information communication and multimedia devices and their equivalents, such as a cellular phone, a smartphone, a tablet Personal Computer (PC), a hand-held PC, a Portable Multimedia Player (PMP), a Personal Digital Assistant (PDA), a music player, e.g., a Motion Pictures Expert Group (MPEG-1 or MPEG-2) Audio Layer-3 (MP3) player, a portable game console, and a digital broadcast receiver. Here, the pointing device can be any one of a light pen, a mouse, a touchpad, a trackball, a touchscreen, and the like. In the following, the description is directed to whether the touchscreen is used as the pointing device.

FIGS. 1 through 9, discussed below, and the various exemplary embodiments used to describe the principles of the present disclosure in this patent document are by way of illustration only and should not be construed in any way that would limit the scope of the disclosure. Those skilled in the art will understand that the principles of the present disclosure may be implemented in any suitably arranged communications system. The terms used to describe various embodiments are exemplary. It should be understood that these are provided to merely aid the understanding of the description, and that their use and definitions in no way limit the scope of the invention. Terms first, second, and the like are used to differentiate between objects having the same terminology and are in no way intended to represent a chronological order, unless where explicitly stated otherwise. A set is defined as a non-empty set including at least one element.

FIG. 1 is a diagram illustrating a screen of a content navigation apparatus according to an exemplary embodiment of the present invention.

Referring to FIG. 1, the content navigation apparatus displays a part of the content 120 on the screen 110 in partial since the size of the content 120 is larger than the screen 110. Here, the content 120 can be a picture, a webpage, or a document. If a drag is detected, the content navigation apparatus scrolls the content 120 in the drag direction to display an off-screen part of the content 120. For example, if the user makes a drag downward, the new part of the content 120 appears from the top of the screen while the onscreen part of the content disappears to the bottom of the screen. Here, the term "drag" means the action in which the user makes a contact at a certain position of the screen with a finger and moves the finger in a certain direction. The drag action can also be referred to as "scroll." In the meantime, although the user makes a drag in a certain direction, the content navigation apparatus is likely to detect a wrong direction which is not intended by the user. In a case where the content navigation apparatus reacts to the drag direction measurement error sensitively, the content 120 is scrolled in a direction not intended by the user. In order to address this problem, an exemplary embodiment of the present invention proposes an improved algorithm for detecting a drag and determining the direction of the drag.

Figure 2:
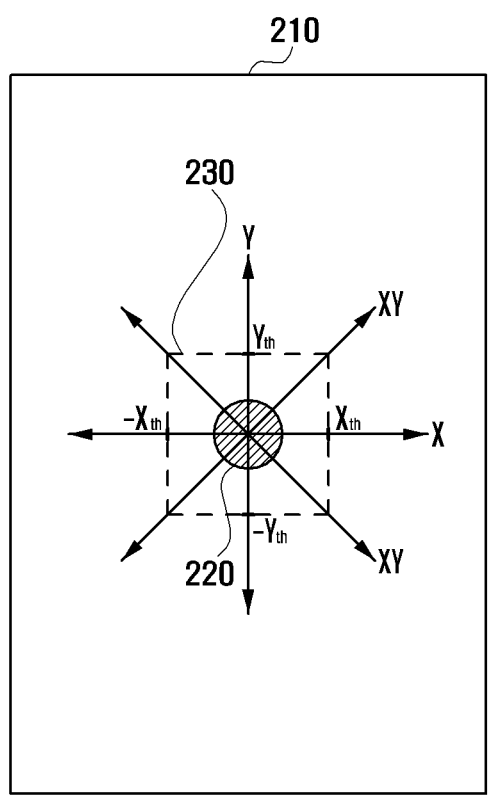
FIG. 2 is a diagram illustrating a principle of an algorithm to detect a drag and determine a drag direction according to an exemplary embodiment of the present invention.

FIG. 2 is a diagram illustrating a principle of an algorithm to detect a drag and determine a drag direction according to an exemplary embodiment of the present invention.

Referring to FIG. 2, in a screen 210, if an X axis displacement from an initial pointing position 220 as a starting point to the current position (i.e., $\Delta x = x_n - x_0$; wherein $x_0$ is the x axis coordinate of the initial pointing position 220, $x_n$ is the x axis coordinate of the current position, and n is 0 or positive integer) is greater than an X axis threshold ($X_{th}$) while a Y axis displacement from the initial pointing position 220 to the current position (i.e., $\Delta y = y_n - y_0$) is less than a Y axis threshold ($Y_{th}$), the content navigation apparatus determines that the drag is made in a horizontal direction, i.e., an X axis direction, and thus scrolls the content based on the X axis displacement ($\Delta x$). That is, the content navigation apparatus scrolls the content in the horizontal direction as much as $\Delta x$. Meanwhile, if $\Delta x \leq X_{th}$ and $\Delta y > Y_{th}$, the content navigation apparatus determines that the drag is made in a vertical direction, i.e., a Y axis direction, and thus scrolls the content based on the Y axis displacement ($\Delta y$).

If $\Delta x > X_{th}$ and $\Delta y > Y_{th}$, the content navigation apparatus determines that the drag is made in a diagonal direction, i.e., an XY axis, and thus scrolls the content in the diagonal direction based on the X and Y axis displacements (i.e., $\Delta x$ and $\Delta y$). In addition, if both the $\Delta x$ and $\Delta y$ are equal to or less than the respective threshold values, the content navigation apparatus determines that no drag has been made yet, and thus maintains the current state of the content. That is, the content navigation apparatus determines that a drag has been made only when the user's touch made on the screen is dragged out of a threshold region 230 determined with $X_{th}$ and $Y_{th}$ as centered around the initial pointing position 220.

Figure 3:
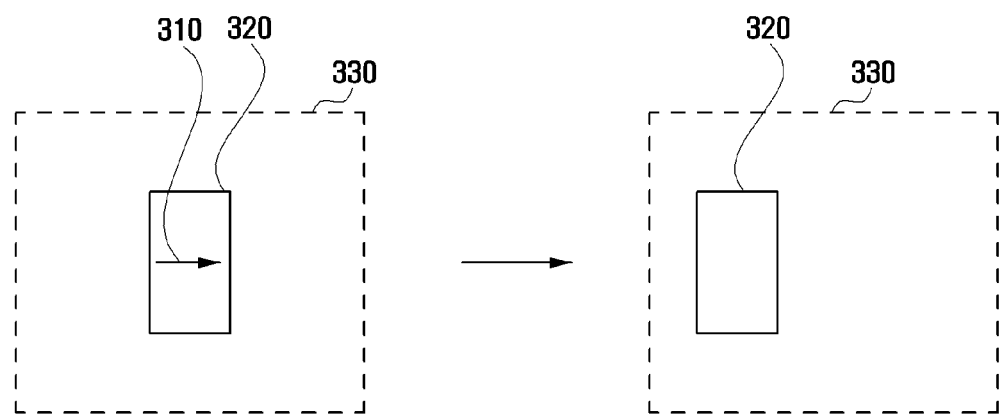
FIG. 3 is a diagram illustrating a scroll of a content larger than a display screen in a horizontal direction in a content navigation apparatus according to an exemplary embodiment of the present invention.
Figure 4:
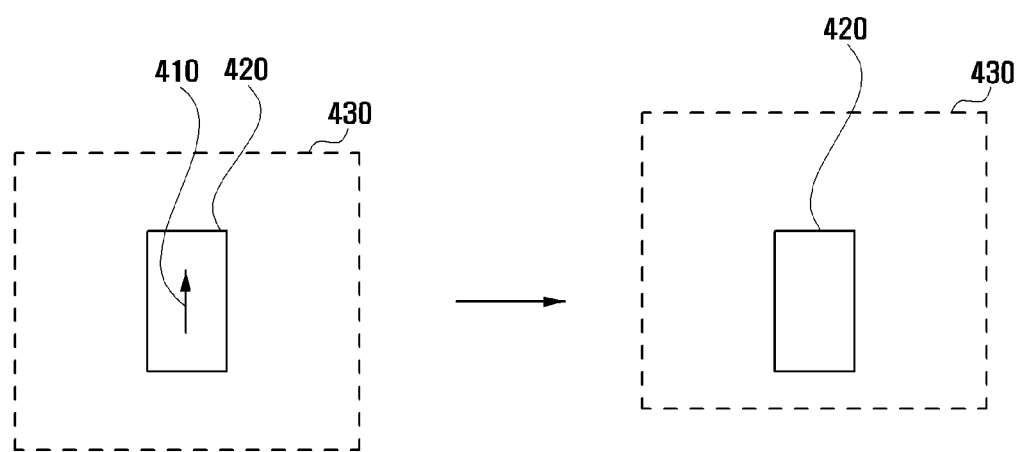
FIG. 4 is a diagram illustrating a scroll of a content larger than a screen in a vertical direction in a content navigation apparatus according to an exemplary embodiment of the present invention.
Figure 5:
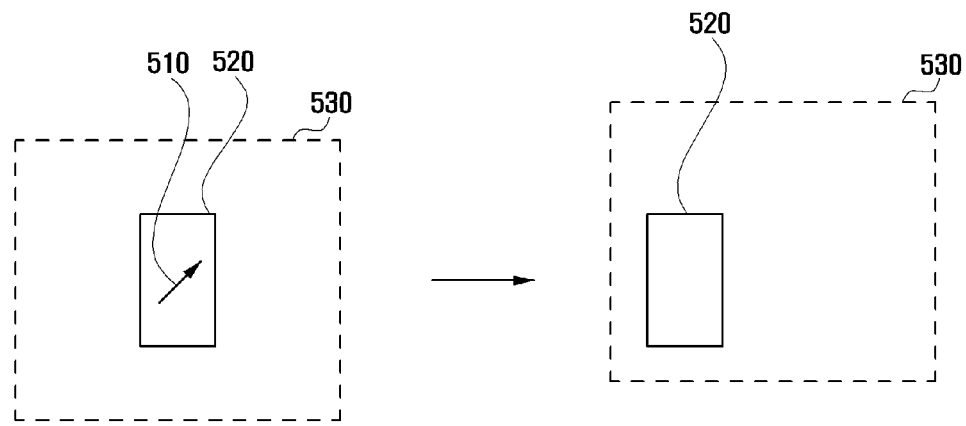
FIG. 5 is a diagram illustrating a scroll of a content larger than a screen in a diagonal direction in a content navigation apparatus according to an exemplary embodiment of the present invention.

FIGS. 3 through 5 are diagrams illustrating scrolls of a content larger than a display screen in a horizontal, a vertical, and a diagonal direction, respectively, according to exemplary embodiments of the present invention.

Referring to FIG. 3, if it is determined that a drag is made rightward 310, the content navigation apparatus scrolls the content 330 rightward 310 across the screen 320. Although not depicted, if it is determined that the drag is made leftward, the content navigation apparatus scrolls the content 330 leftward across the screen 320.

Referring to FIG. 4, if it is determined that the drag is made upward 410, the content navigation apparatus scrolls the content 430 upward 410 across the screen 420. Although not depicted, if it is determined that the drag is made downward, the content navigation apparatus scrolls the content 430 downward across the screen 420.

Referring to FIG. 5, if it is determined that the drag is made in a diagonal direction, i.e., an up-right direction 510, the content navigation apparatus scrolls the content 530 in the up-right direction 510 across the screen 520. Although not depicted, if it is determined that the drag is made in another diagonal direction, i.e., one of up-left, down-right, and down-left directions, the content navigation apparatus scrolls the content 530 in a corresponding direction across the screen 520. The content scroll apparatus is capable of scrolling the content in 8 different directions.

Figure 6:
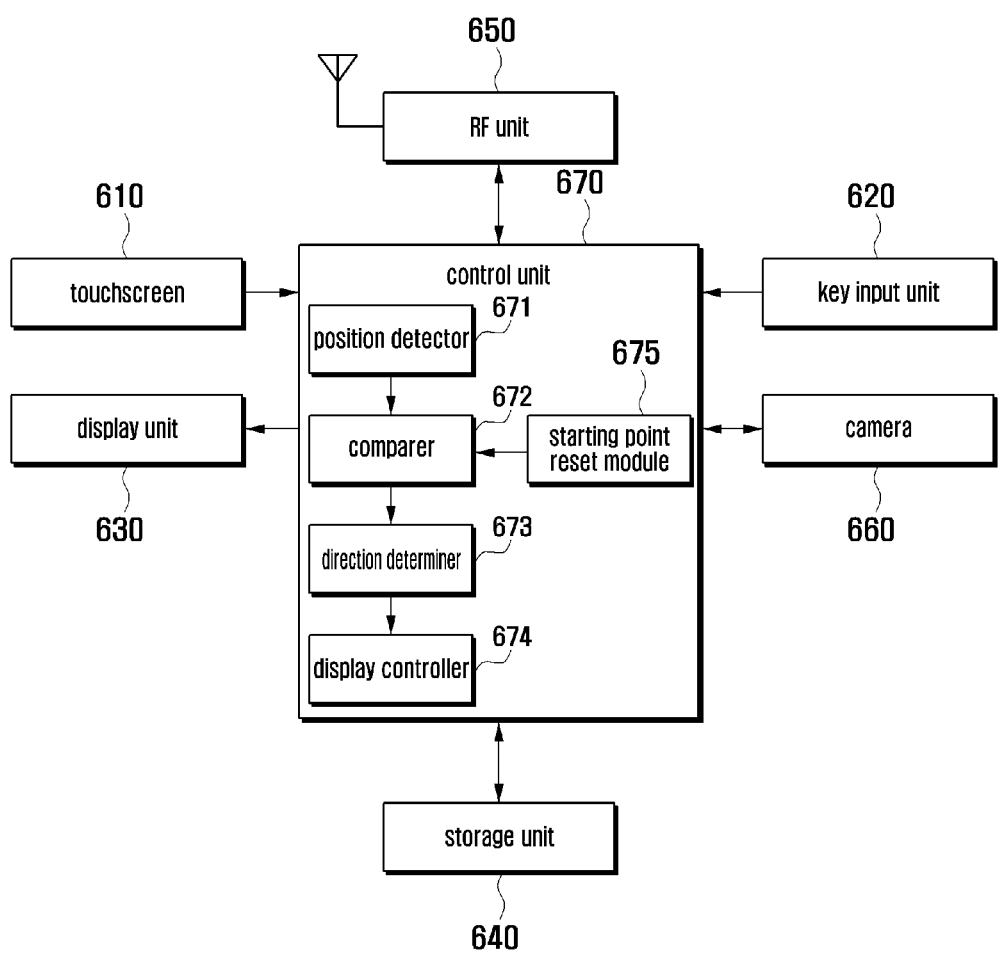
FIG. 6 is a block diagram illustrating a configuration of a content navigation apparatus according to an exemplary embodiment of the present invention.

FIG. 6 is a block diagram illustrating a configuration of a content navigation apparatus according to an exemplary embodiment of the present invention.

Referring to FIG. 6, the content navigation apparatus includes a touchscreen 610, a key input unit 620, a display unit 630, a storage unit 640, a Radio Frequency (RF) unit 650, a camera 660, and a control unit 670.

If a drag is detected on the screen while displaying the content larger than a screen, the content navigation apparatus determines the direction of the drag. The content navigation apparatus can scroll the content in the determined drag direction to show an off-screen part of the content. The content navigation apparatus traces a touch position. If no change is detected in the touch position in a predefined time period, the content navigation apparatus resets the initial drag position for detecting a drag and for determining the drag direction. Until the user's finger is released from the screen, the initial touch position can be maintained as the starting point of a drag.

The touchscreen 610 generates a touch signal to the control unit 670 in response to a touch event made by the user at a certain position on the screen. The touch event can be categorized into one of a touch, a tap, a double tap, a press, a drag, a drag & drop, a flick, and a drag & flick. Here, the term "touch" denotes an action in which the user makes contact at a certain position on the screen, "tap" denotes an action in which the user makes contact at a certain position on the screen and releases the contact on the screen, "double tap" denotes an action in which the user makes the tap twice, "press" denotes an action in which the user makes a contact at a certain position on the screen longer than the length of a tap and releases the contact without any horizontal movement, "drag" denotes an action in which the user makes a contact at a certain position on the screen with a finger and moves the finger in a certain direction without releasing the contact, "drag & drop" denotes an action in which the user makes a drag and releases the contact, and "flick" denotes an action in which the user makes a touch at a certain position on the screen and releases quickly as if skimming the screen. In addition, the term "drag and flick is an action in which the user makes a drag and a flick in sequence (that is, the finger makes the drag and flick actions without releasing the contact until the flick action). The control unit 670 can discriminate between the drag and flick actions based on the action speed. The control unit 670 determines the scroll direction of the content based on the touch event. More particularly, if a drag action escaping from the threshold region 230 (see FIG. 2) is detected while the content is partially displayed on the screen, the control unit 670 executes the algorithm for determining the direction of the drag.

The key input unit 620 is provided with a plurality of keys related to the operation of the content navigation apparatus and generates a key signal to the control unit 670 in response to a user input. The key signal can be any one of a power-on/off signal, a volume control signal, a screen on/off signal, and the like.

The display unit 630 converts the analog signal input by the control unit 670 into an analog signal that can be displayed in the form of visual information. The display unit 670 can be implemented with a flat panel display, such as a Liquid Crystal Display (LCD) and an Organic Light Emitting Diode (OLED). The display unit 630 can output a left eye image and a right eye image and, in this case, may include a 3-dimentional (3D) renderer to give depth to the image. The 3D render can be implemented in the form of a lamination. The 3D renderer renders the left and right eye images recognized by the respective left and right eyes of the users. The 3D rendering technique can be categorized into one of glasses-assisted viewing technique and bare eyes viewing technique. The glasses-assisted viewing technique can be further categorized into one of a color filter technique, a polarization filter technique, and a shutter glass technique, and the bare eyes viewing technique can be further categorized into one of a Lenticular Lens technique and a Parallel Barrier technique. Since these 3D rendering techniques are well known in the art, detailed descriptions thereon are omitted herein.

The storage unit 640 stores application programs related to the functions and the screen images to be displayed by the display unit 630. The storage unit 640 can also store a key map and a menu map to be used in association with the touchscreen 610. Here, the key map and menu map can be provided in various forms. For example, the key map can be any one of a universal keyboard map, a 3×4 key map, a QWERTY key map, a control key map for controlling the currently executed application, and the like. The menu map can be a menu map related to the currently running application program.

The storage unit 640 can be divided into program and data regions. The program region stores an Operating System (OS) for booting the content navigation apparatus and for managing the operations of the internal components and various functions, such as a call place function, a web browser function, an MP3 player function, and a still and motion picture playback function. More particularly, the program region stores an algorithm for detecting a drag and for determining drag direction and an algorithm for resetting the starting point of the drag. The data region stores the data generated in the content navigation apparatus, such as phonebook icons representing widgets, and other contents. More particularly, while the content larger than the screen is displayed, the data region can temporarily store the starting point of a drag and the reset starting point of the drag. The data region can also store a value indicating whether the starting point is reset. Whether the starting point is reset can be configured by the user. That is, the control unit 670 transfers the setting value input by means of the touchscreen 610 or the key input unit 620, and the storage unit 640 can store the setting value in the data region.

The RF unit 650 is responsible for establishing a communication channel with other terminals through a network. The RF unit 650 can include a communication module supporting at least one communication protocol for establishing communication channel with the network. For example, the RF unit 650 can include at least one communication module supporting at least one of a Code Division Multiple Access (CDMA), a Global System for Mobile communications (GSM), a Wideband CDMA (WCDMA), and an Orthogonal Frequency-Division Multiple Access (OFDMA).

The camera 660 takes a picture and transfers the picture to the control unit 670 and can include a front camera arranged toward on the front wall of the apparatus and a rear camera arranged on the rear wall of the apparatus.

The control unit 670 controls overall operations of the content navigation apparatus and signaling among the internal function blocks of the content navigation apparatus. More particularly, the control unit 670 includes a position detector 671 for detecting a touch made on the screen while the content larger than the screen is displayed and for tracing the movement of the contact to acquire current touch point, a comparer 672 for comparing the X axis displacement and Y axis displacement between the initial touch point and the current touch point and the respective X axis threshold value and Y axis threshold value, a direction determiner 673 for determine the drag direction among an X axis direction, a Y axis direction, and an XY axis (diagonal) direction, a display controller 674 for scrolling the content in the determined direction and for controlling the display unit 630 to display the scrolled part of the content, and a starting point reset module 675 for resetting, when the touch is not moved in a predefined time period, the starting point to the current point and for notifying the comparer 672 of the reset starting point.

A description of exemplary operations of the controller 670 is made below with reference to FIGS. 7 through 9.

Figure 7:
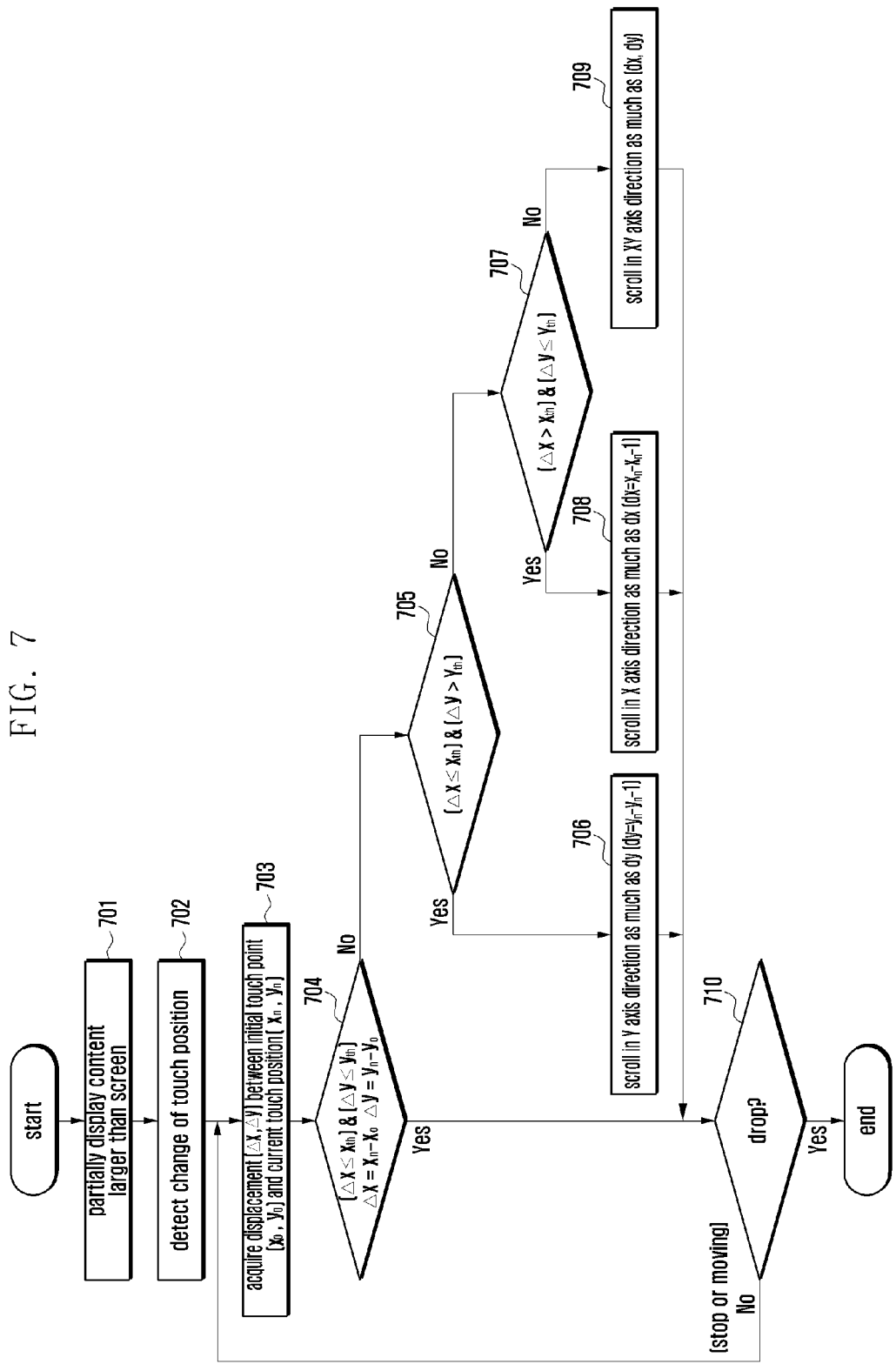
FIG. 7 is a flowchart illustrating a content navigation method according to an exemplary embodiment of the present invention.

FIG. 7 is a flowchart illustrating a content navigation method according to an exemplary embodiment of the present invention.

Referring to FIG. 7, the display unit 630 displays content larger than the screen such that a certain part of the content appears in the screen under the control of the control unit 670 at step 701. The position detector 671 of the control unit 670 detects a touch and change of the contact point of the touch at step 702, and the control unit 670 determines the current touch point $(x_n, y_n)$ in comparison with the initial touch point $(x_0, y_0)$ at step 703. The current touch point can be acquired in various ways. For example, the position detector 671 can acquire the current touch point by sampling the touch position value provided by the touchscreen 610 at a predefined interval. The comparer 672 of the control unit 670 calculates the X axis displacement (−x) and Y axis displacement (−y) and compares the X and Y axis displacements with the X axis threshold value $(X_{th})$ and the Y axis threshold value $(Y_{th})$, respectively.

Thereafter, the direction determiner 673 of the control unit 670 determines whether −x is equal to or less than the X axis threshold value and −y is equal to or less than the Y axis threshold value at step 704. If both the −x and −y are equal to or less than the respective X and Y axis threshold values, the procedure goes to step 710 and, otherwise, this means the occurrence of a drag and thus the procedure goes to step 705 to determine the direction of the drag.

At step 705, the direction determiner 673 determines whether −x is equal to or less than $X_{th}$ and −y is greater than $Y_{th}$. If it is determined at step 705 that −x is equal to or less than $X_{th}$ and −y is greater than $Y_{th}$, the drag direction is Y axis direction. In this case, the display controller 674 of the control unit 670 scrolls the content in the Y axis direction as much as dy $(=y_n-y_{n-1})$ and controls the display unit 630 to display the scrolled part of the content at step 706. Here, $Y_{n-1}$ is the Y coordinate of the touch point acquired previously and can be the Y coordinate of the initial touch point. In contrast, if it is determined at step 705 that −x is not equal to or less than $X_{th}$, the procedure goes to step 707.

At step 707, the direction determiner 673 determines whether −x is greater than $X_{th}$ and −y is equal to or less than $Y_{th}$. If it is determined at step 707 that −x is greater than $X_{th}$ and −y is equal to or less than $Y_{th}$, the direction determiner 673 determines that the drag is made in the X axis direction.

In this case, the display controller 674 scrolls the content in the X axis direction as much as dx $(=x_n-x_{n-1})$ and controls the display unit 630 to display the scrolled part of the content at step 708. Here, $X_{n-1}$ is the X coordinate of the touch point acquired previously and can be the X coordinate of the initial touch point.

In contrast, if it is determined at step 707 that −y is not equal to or less than $Y_{th}$, i.e., both −x and −y are greater than the respective threshold values, the direction determiner 673 determines that the drag is made in the XY axis, i.e., a diagonal direction. In this case, the display controller 674 scrolls the content in the X axis as much as dx and in the Y axis as much as dy and controls the display unit 630 to display the scrolled part of the content.

After scrolling the content at step 706, 708, or 709, the control unit 670 determines whether a drop event is detected at step 710. If a drop event is detected, the content navigation procedure ends. In contrast, if the user maintains the touch, i.e., the touch is in the middle of a dragging action or stays at a certain position, the control unit 670 returns to step 703 to repeat the above described process.

According to the exemplary embodiment described above with reference to FIG. 7, the initial touch point is maintained as the starting point of the drag as a reference point for determining whether a touch is dragged out of the threshold region 230 unless the touch is released regardless of the stop of the drag movement. In the following description, however, the starting point is reset to the touch point where the drag action has stopped.

Figure 8:
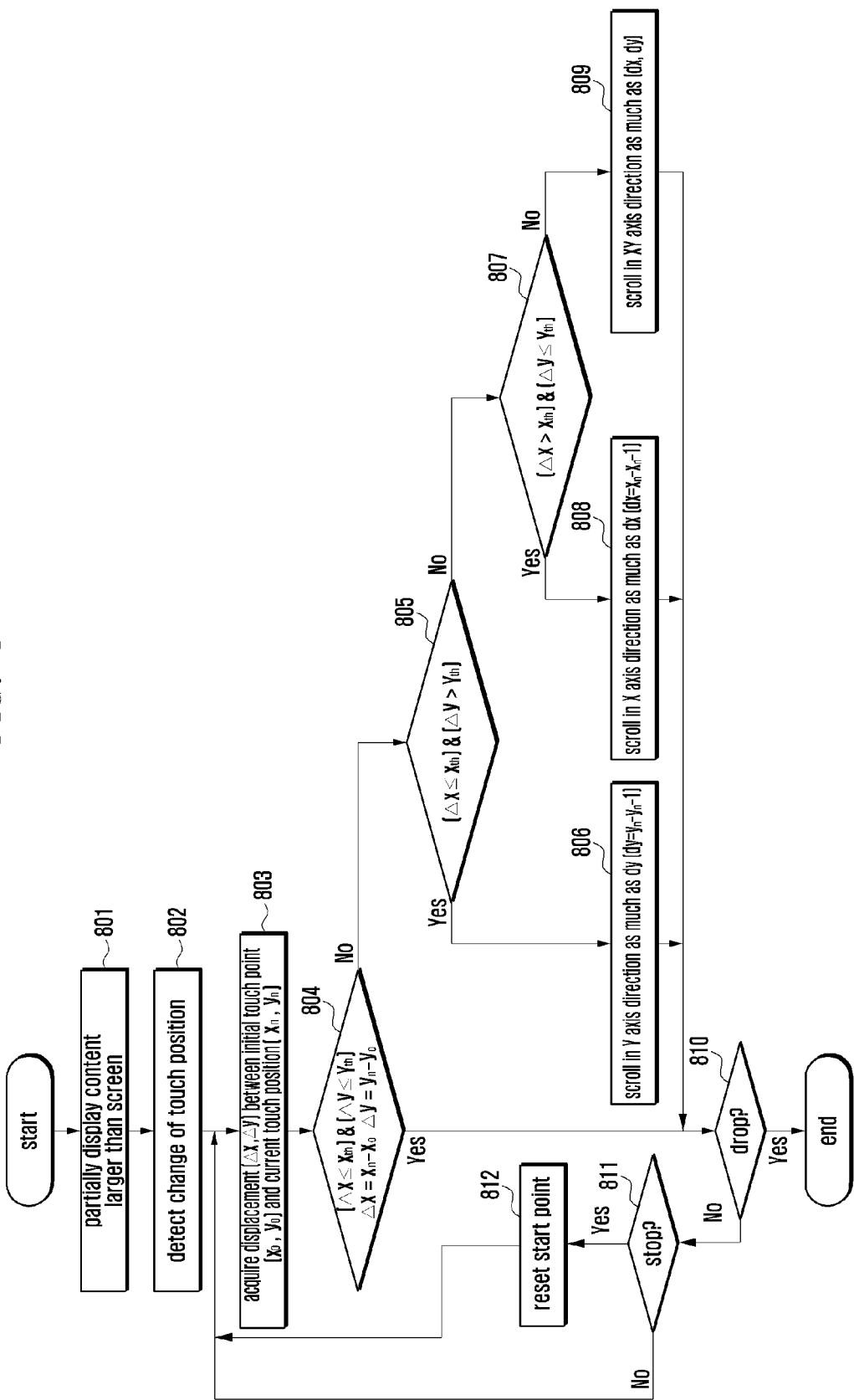
FIG. 8 is a flowchart illustrating a content navigation method according to another exemplary embodiment of the present invention.

FIG. 8 is a flowchart illustrating a content navigation method according to another exemplary embodiment of the present invention.

Referring to FIG. 8, since steps 801 to 810 are identical with steps 701 to 710 of FIG. 7, detailed descriptions thereon are omitted herein. However, the current touch point is not acquired by referencing the initial touch point but by referencing the starting point reset at step 812. More specifically, the control unit 670 traces the touch point to determine whether the drag of the touch stops at step 811. If it is determined that the touch event is dragging without a stop, the procedure returns to step 803. In contrast, if it is determined that the touch stays at a certain position over a predefined time period, the starting point reset module 675 resets the touch point where the touch has stayed over the time period as a new starting point for drag afterward at step 812. The control unit 670 acquires the current touch point by referencing the reset starting point and detects a drag action and determines the drag direction based on the newly acquired current touch point.

Figure 9:
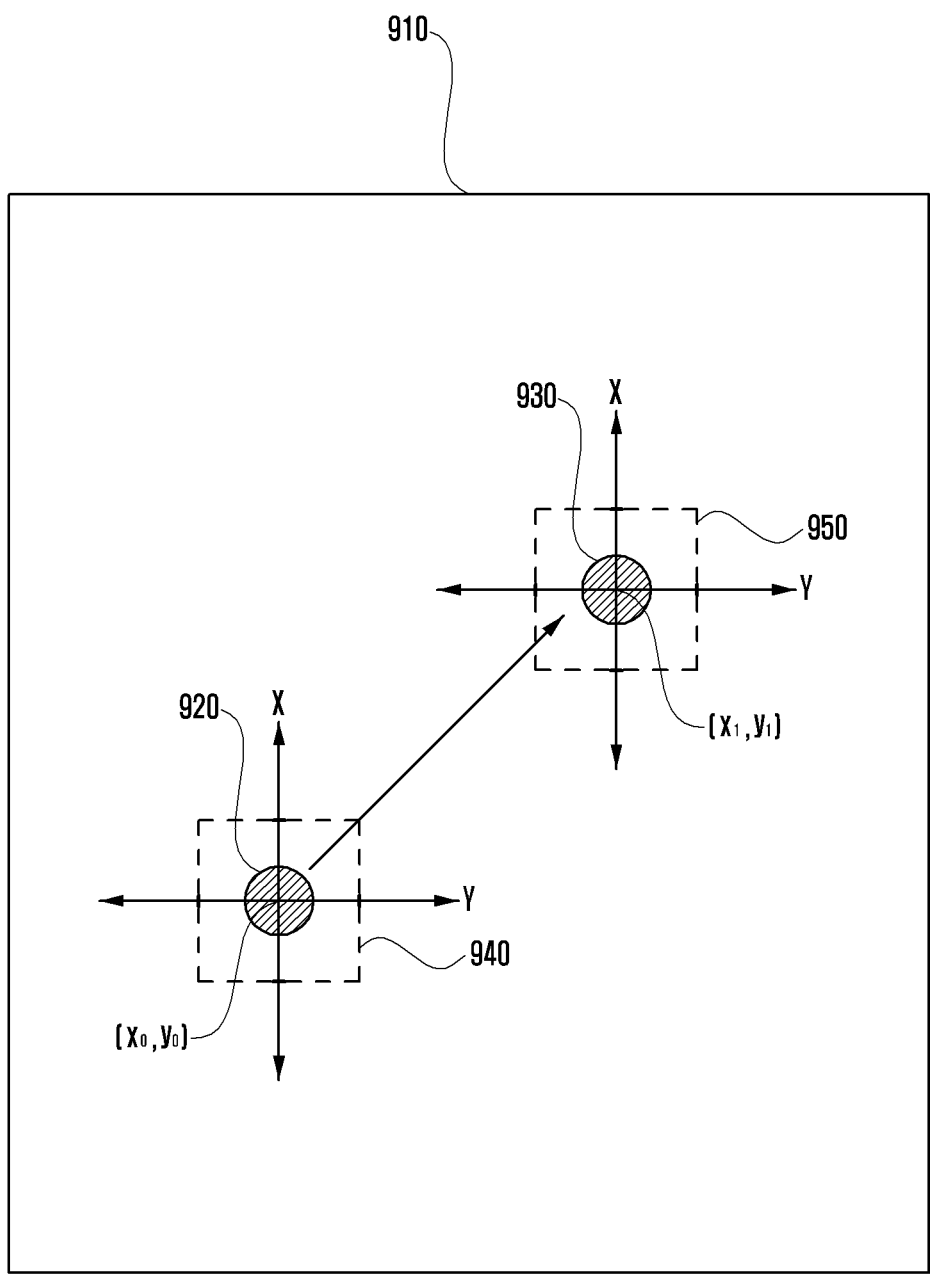
FIG. 9 is a diagram illustrating a procedure for resetting a starting point of a drag in a content navigation method according to an exemplary embodiment of the present invention.

FIG. 9 is a diagram illustrating a procedure for resetting a starting point of a drag in a content navigation method according to an exemplary embodiment of the present invention.

Referring to FIG. 9, the control unit 670 determines a first threshold region 940 centered around the initial touch point $(x_0, y_0)$ 920 on the screen 910. If the touch moves to a certain position and stays at the position over a predefined time period, the control unit 670 resets the touch point $(x_1, y_1)$ 930 of the corresponding position as a new starting point for a future drag action and determines a second threshold region centered around the new starting point 930. If the touch moves from the new starting point 930 out of the second threshold region 950, the control unit 670 determines that a drag action is made. Meanwhile, the control unit 670 can determine the configuration values stored in the data region of the storage unit 640 to determine whether to reset the starting point.

As described above, the content navigation method and apparatus of the present invention are capable of scrolling content larger than the screen in a direction accurately as the user intended.

While the invention has been shown and described with reference to certain exemplary embodiments thereof, it will be understood by those skilled in the art that various changes in form and details may be made therein without departing from the sprit and the scope of the invention as defined by the appended claims and their equivalents.

What is claimed is:

1. A content navigation method using a pointing device, the method comprising:
    acquiring, when a pointing position is changed on a screen partially displaying a content that is larger than the screen, a current pointing position by tracking the change of the pointing position;
    comparing an X axis displacement and a Y axis displacement from an initial pointing position as a starting position to the current pointing position with a predefined X axis threshold value and Y axis threshold value, respectively;
    determining a movement direction as one of an X axis, a Y axis, and an XY (diagonal) axis directions based on the comparison result;
    scrolling the content in the movement direction to display an off-screen part of the content;
    determining whether the current pointing position stays without movement over a predefined time period;
    storing a setting value indicating that the starting point is to be reset when the current pointing position is determined to stay without movement over the predefined time period;
    determining to reset the starting point when the stored setting value indicates that the starting point is to be reset; and
    resetting the starting point to be the current pointing position when the determination is made to reset the starting point.

2. The method of claim 1, further comprising:
    determining, if the touch moves to a certain position and stays at the position over a predefined time period, a first threshold region centered around an initial touch point on the screen;
    resetting the touch point of the corresponding position as a new starting point for a future drag action; and
    determining a second threshold region centered around the new starting point.

3. The method of claim 2, further comprising:
    determining that a drag action is made if the touch moves from the new starting point out of the second threshold region.

4. The method of claim 1, wherein the scrolling of the content in the movement direction comprises:
    moving, when the movement direction is the X axis direction, the content in the X axis direction as much as the displacement between a current X axis coordinate and a previous X axis coordinate;
    moving, when the movement direction is the Y axis direction, the content in the Y axis direction as much as the displacement between the current Y axis coordinate and the previous Y axis coordinate; and
    moving, when the movement direction is the XY (diagonal) axis direction, the content in the X axis direction as much as the displacement between the current X axis coordinate and the previous X axis coordinate and in the Y axis direction as much as the displacement between the current Y axis coordinate and the previous Y axis coordinate.

5. The method of claim 1, wherein the acquiring of the current position comprises generating a touch signal in response to a touch made by a user at a certain position on the screen.

6. The method of claim 1, wherein the determining of the movement direction comprises:
    determining, when the X axis displacement is greater than the X axis threshold value and the Y axis displacement is equal to or less than the Y axis threshold value, the movement direction as the X axis direction;
    determining, when the X axis displacement is equal to or less than the X axis threshold value and the Y axis displacement is greater than the Y axis threshold value, the movement direction as the Y axis direction; and
    determining, when the X axis displacement is greater than the X axis threshold value and the Y axis displacement is greater than the Y axis threshold value, the movement direction as the XY (diagonal) axis direction.

7. A content navigation apparatus using a pointing device, the apparatus comprising:
    a display unit configured to partially displaying a content that is larger than a screen;
    a position detector configured to acquire, when a pointing position is changed on the screen, a current pointing position by tracking the change of the pointing position;
    a comparer configured to compare an X axis displacement and a Y axis displacement from an initial pointing position as a starting position to the current pointing position with a predefined X axis threshold value and Y axis threshold value, respectively;
    a direction determiner configured to determine a movement direction as one of an X axis, a Y axis, and an XY (diagonal) axis directions based on the comparison result;
    a display controller configured to scroll the content in the movement direction to display an off-screen part of the content;
    a control unit configured to:
        determine whether the current pointing position stays without movement over a predefined time period,
        store a setting value indicating that the starting point is to be reset when the current pointing position is determined to stay without movement over the predefined time period, and
        determine to reset the starting point when the stored setting value indicates that the starting point is to be reset; and
    a starting point reset module configured to reset the starting point to be the current pointing position when the determination is made to reset the starting point.

8. The apparatus of claim 7, wherein the position detector comprises a touchscreen for generating a touch signal in response to a touch made by a user at a certain position on the screen.

9. The apparatus of claim 7, wherein the control unit determines a first threshold region centered around an initial touch point on the screen, if the touch moves to a certain position and stays at the position over a predefined time period, resets the touch point of the corresponding position as a new starting point for a future drag action, and determines a second threshold region centered around the new starting point.

10. The apparatus of claim 9, wherein the control unit determines that a drag action is made if the touch moves from the new starting point out of the second threshold region.

11. The apparatus of claim 7, wherein the display controller moves the content in the X axis direction as much as the displacement between a current X axis coordinate and a previous X axis coordinate when the movement direction is the X axis direction, in the Y axis direction as much as the displacement between the current Y axis coordinate and the previous Y axis coordinate when the movement direction is the Y axis direction, and in the X axis direction as much as the displacement between the current X axis coordinate and the previous X axis coordinate and in the Y axis direction as much as the displacement between the current Y axis coordinate and the previous Y axis coordinate when the movement direction is the XY (diagonal) axis direction.

12. The apparatus of claim 7, wherein the direction determiner is configured to determine the movement direction as the X axis direction when the X axis displacement is greater than the X axis threshold value and the Y axis displacement is equal to or less than the Y axis threshold value, as the Y axis direction when the X axis displacement is equal to or less than the X axis threshold value and the Y axis displacement is greater than the Y axis threshold value, and as the XY (diagonal) axis direction when the X axis displacement is greater than the X axis threshold value and the Y axis displacement is greater than the Y axis threshold value.

\* \* \* \* \*